United States Patent [19]
Hong

[11] Patent Number: 6,086,273
[45] Date of Patent: Jul. 11, 2000

[54] BRAILLE LABEL WRITER HAVING STATIONARY SOLENOID DRIVEN INSCRIBING MECHANISM

[75] Inventor: Ri Su Hong, Tokyo, Japan

[73] Assignee: KGS Corporation, Saitama-ken, Japan

[21] Appl. No.: 09/316,078

[22] Filed: May 20, 1999

[30]     Foreign Application Priority Data

Jun. 1, 1998   [JP]   Japan ................................... 10-003792

[51] Int. Cl.$^7$ ........................................................ B41J 3/32
[52] U.S. Cl. ........................ 400/109.1; 400/87; 400/483; 400/98
[58] Field of Search ............................... 400/87, 88, 109, 400/109.1, 483, 98, 485, 487

[56]     References Cited

U.S. PATENT DOCUMENTS

| | | | |
|---|---|---|---|
| 2,454,637 | 11/1948 | De La Fuente Tejedo | 400/109.1 |
| 3,235,055 | 2/1966 | Pagenkopf | 400/487 |
| 4,261,663 | 4/1981 | Grimnes | 400/109.1 |
| 4,445,871 | 5/1984 | Becker | 400/109.1 |
| 4,488,828 | 12/1984 | Ohtsuki | 400/109.1 |
| 5,557,269 | 9/1996 | Montane | 400/109.1 |
| 5,746,518 | 5/1998 | Ogawa et al. | 400/109.1 |
| 5,826,994 | 10/1998 | Palmer | 400/120.05 |

FOREIGN PATENT DOCUMENTS 3-9863   1/1991   Japan .

OTHER PUBLICATIONS

Abstract of 3–9863, Jan. 17, 1991, Japan.

*Primary Examiner*—John S. Hilten
*Assistant Examiner*—Leslie J. Grohusky
*Attorney, Agent, or Firm*—Christensen O'Connor Johnson & Kindness PLLC

[57]     ABSTRACT

A braille label writer for inscribing braille on a labeling tape, according to the invention, comprises an operating section provided with operation keys including an input key, a memory for storing information concerning letter codes and braille codes, a display section for displaying information including letters, converting means for converting a letter code into a braille code, and an inscribing section for inscribing braille corresponding to the converted braille code. The inscribing section includes a plurality of solenoids having plungers, levers provided for the respective solenoids for transmitting driving forces of the plungers of the solenoids, and push pins for forming raised braille characters on the labeling tape. The plungers are arranged parallel to the push pins. Each of the levers has one end supported movably by an upper portion of a corresponding one of the plungers, also has an intermediate portion supported rotatably about a stationary fulcrum, and has another end holding, with a certain freedom, a lower end of a corresponding one of the push pins.

8 Claims, 5 Drawing Sheets

BRAILLE LABEL WRITER HAVING STATIONARY SOLENOID DRIVEN INSCRIBING MECHANISM

BACKGROUND OF THE INVENTION

This invention relates to a braille label writer with which even a sighted person who does not have knowledge of braille can easily inscribe braille on a label.

The range of activities of visually impaired people is now gradually increasing, and the opportunities for them to go into public places are increasing more and more. Under these circumstances, it is necessary for them to handle, for example, vending machines for train tickets, tobacco, beverages, meal tickets, etc. This means that those vending machines must be modified so that visually impaired people can use them. Similarly, banks or post offices are required to employ means for aiding and enabling visually impaired people to operate cash dispensers.

As described above, to support an increasing activity range of visually impaired people, it is necessary to modify devices and goods required for everyday life and handled by sighted people, so that visually impaired people can handle them in a similar manner to the sighted people. To this end, it is necessary to display, using braille, the names or prices of everyday goods or instructions for handling them, as well as information put on the aforementioned vending machines. Moreover, it is desirable that the contents of bankbooks for visually impaired people be displayed using braille. In addition, where the range of activities of visually impaired people increases, and various types of braille displays are required for the same things as sighted people, prompt action to facilitate everyday life is required as well. In other words, in light of the fact that, for example, the prices of train tickets or everyday goods are changed in a relatively short time, it is necessary to promptly inform visually impaired people of the price changes. Accordingly, in the near future, price labelling using braille needs to be performed at individual stores in many cases. However, at the present stage, there is no system that satisfies such a demand in the near future.

Japanese Patent Application KOKOKU Publication No. 3-9863, for example, discloses a conventional braille input device for recording and outputting the names or prices of goods using braille. This device, however, has its operation manner adapted for visually impaired people, and hence is not appropriate for anyone who does not have knowledge of braille. As a device which can be handled by sighted people, a device is known, which comprises a personal computer and a braille printer, and in which a usual letter input by sighted people is converted into braille using braille converting software. Since this usual-letter/braille converting device is formed at present by combining a general-purpose personal computer and a braille printer, it inevitably has a large size and is expensive, which means that it is not suitable for practical use in society in general.

Also, in the conventional braille printer, the plunger of its solenoid is coaxial with its push pin, and printing is performed while the solenoid itself is moved. Thus, the printer requires mechanisms for moving and positioning the solenoid and a mechanism for controlling them, resulting in a high cost.

BRIEF SUMMARY OF THE INVENTION

The present invention has been developed under the above-described circumstances, and is aimed at providing a braille label writer which enables even a person with no knowledge of braille to easily create a braille label, and which is of a size small enough to carry and can be manufactured at a cost low enough for an individual store to buy.

A braille label writer for inscribing braille on a labeling tape, according to the invention, comprises: operating means provided with operation keys including an input key; storage means for storing information concerning letter codes and braille codes; display means for displaying information including letters; converting means for converting a letter code into a braille code; and inscribing means for inscribing braille corresponding to the converted braille code; wherein the inscribing means includes a plurality of solenoids having plungers, levers provided for the respective solenoids for transmitting driving forces of the plungers of the solenoids, and push pins for forming raised braille characters on the labeling tape, the plungers being arranged parallel to the push pins, each of the levers having one end rotatably supported by an upper portion of a corresponding one of the plungers, also having an intermediate portion supported rotatably about a stationary fulcrum, and having another end holding, with a certain freedom, a lower end of a corresponding one of the push pins. This structure enables intensive provision of functions necessary for creating a braille label. Since in particular, the solenoids themselves do not move in the label writer of the invention during inscription, any expensive driving/positioning mechanism and its control mechanism are not required. Accordingly, the invention can provide a braille label writer of a size and a price suitable for general shops.

Further, the invention is also characterized in that the fulcrum and the solenoids are adjustable in position, and that voltage pulses are applied to the respective solenoids of the inscribing means with time lags so that they will not be applied simultaneously. Positional adjustment of the solenoids and their fulcrums enables adjustment of the height of each push pin, which means that the inscribing pressure of each push pin can be controlled. Also, provision of time lags in the application of voltage pulses to the solenoids can reduce the power capacity required for driving the solenoids.

The invention is further characterized in that the operating means includes retrieving means for retrieving letter codes stored in the storage means, and an input key for inputting a specified item that consists of a plurality of letters. The specified-item input key enables "one-touch" input of, for example, an article that is input so often.

Moreover, the invention is characterized by further comprising printing means for printing a letter corresponding to a braille character output from the inscribing means. This printing means enables even sighted people with no knowledge of braille to confirm the contents of a braille label, thereby preventing input errors such as an erroneous letter, missing of a letter, the amount of money, etc.

In addition, the invention is characterized in that the labeling tape is formed of a transparent member having a protective paper sheet adhered to its reverse surface with an adhesive, and having a mark indicative of a direction clearly specified thereon. This labeling tape is easy to handle, can be adhered even to an article or device on which the name of an article is written for sighted people, and can be adhered in a correct direction.

Additional objects and advantages of the invention will be set forth in the description which follows, and in part will be obvious from the description, or may be learned by practice of the invention. The objects and advantages if the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
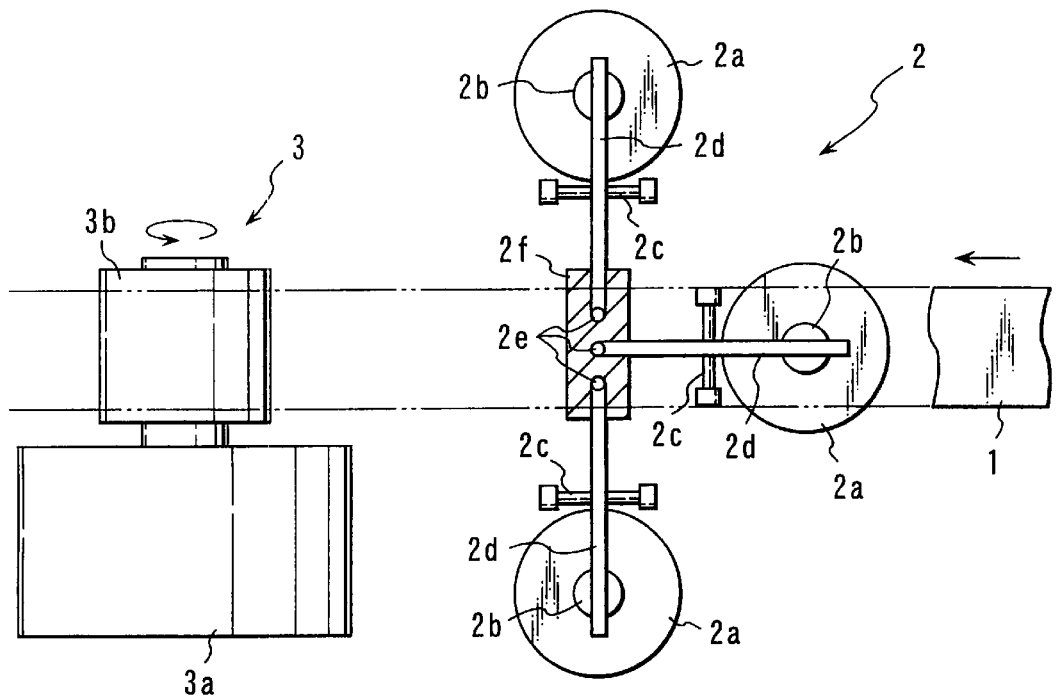
FIG. 1A is a plan view partly in section, useful in explaining a braille inscribing mechanism incorporated in a braille label writer according to the invention.
Figure 1B:
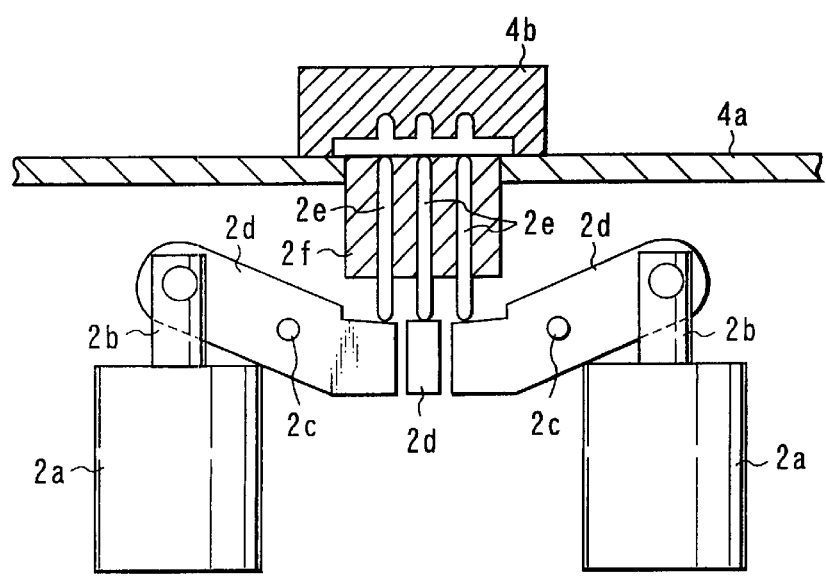
FIG. 1B is a side view partly in section, also useful in explaining the braille inscribing mechanism.

Braille label writers according to the embodiments of the invention will be described with reference to the accompanying drawings. FIGS. 1A and 1B are plan and side views partly in section, useful in explaining a braille inscribing mechanism incorporated in a braille label writer according to the invention. In these figures, reference numeral 1 denotes a labeling tape for inscribing braille thereon, which is to be cut into labels and has a separable protective paper sheet adhered to its reverse surface with an adhesive. Further, the labeling tape is made of a transparent material with a direction mark printed thereon. In FIG. 1A, the arrow just above the labeling tape 1 indicates the direction of transfer of the labeling tape 1.

Reference numeral 2 denotes an inscribing mechanism which has a main part including three solenoids 2a that are held stationary in the label writer during inscription.

Figure 2A:
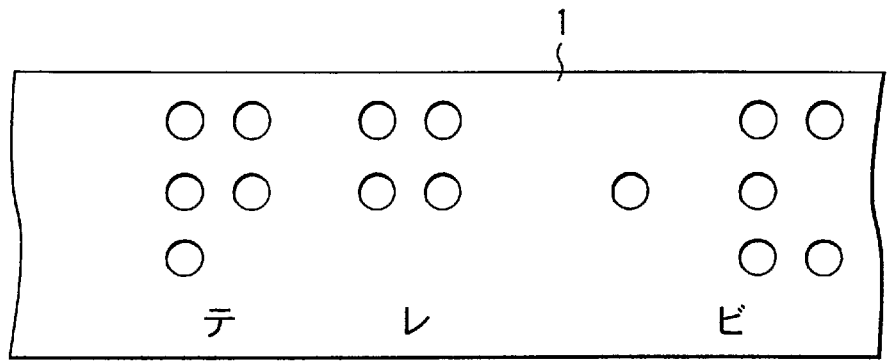
FIG. 2A is a plan view of a labelling tape according to the invention, on which braille is inscribed and usual letters are printed.
Figure 2B:
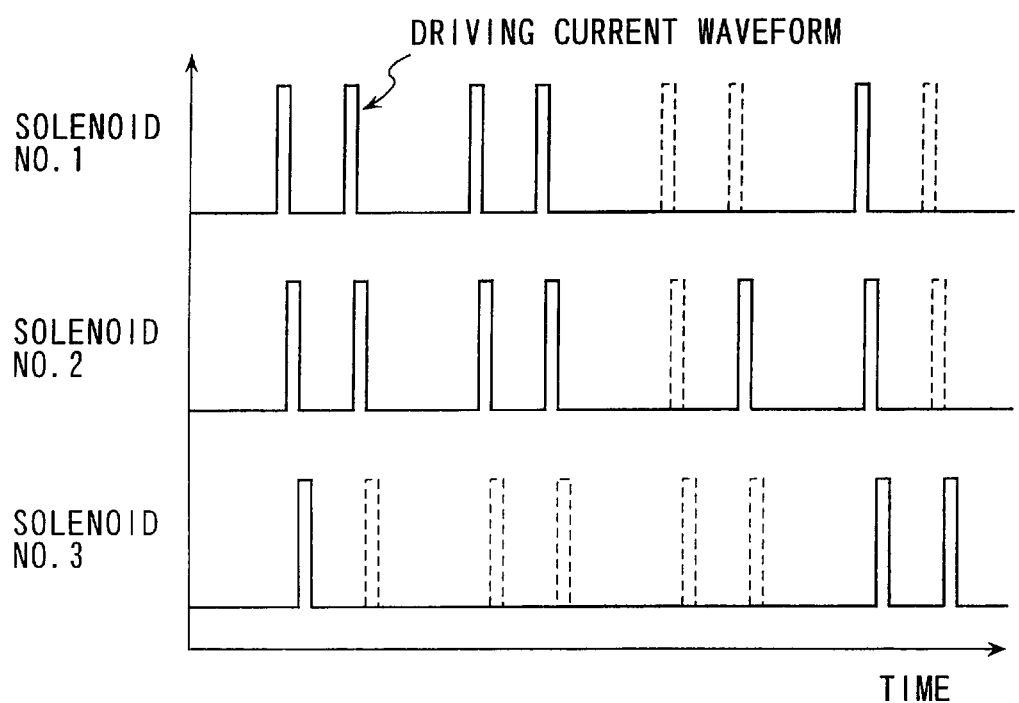
FIG. 2B is a view illustrating the waveforms of currents for driving an inscribing solenoid.

Each solenoid 2a vertically supports a plunger 2b. Two of the three solenoids 2a are situated substantially perpendicular to the transfer direction of the labeling tape 1, while the other one is situated parallel to it. Thus, the three solenoids 2a are arranged in a triangle. The main part of the inscribing mechanism 2 also includes three levers 2d, three push pins 2e and a push pin guiding member 2f. Each of the three levers 2d has an end thereof rotatably connected to an upper end portion of the plunger 2b of a corresponding one of the solenoids 2a, and has an intermediate portion thereof supported rotatably about a fulcrum 2c. Each of the push pins 2e has a lower end portion thereof supported by the other end of a corresponding one of the levers 2d and adapted to inscribe, with its head, a raised dot as a braille character. The push pin guiding member 2f holds the three push pins 2e such that they are movable vertically, thereby enabling linear arrangement of the heads of the three push pins 2e. The push pin guiding member 2f has push pin guiding holes formed therein such that the three push pins 2e can be adjusted in positions slightly deviated from positions aligned in a direction perpendicular to the transfer direction of the labeling tape 1. This structure is employed to compensate displacements of inscription positions due to time lags, with which exciting current pulses are applied to the solenoids 2a as shown in FIG. 2B that will be referred to later.

The upper surface of the push pin guiding member 2f is level with the inscribing surface 4a of a braille inscribing section 4 shown in FIG. 3 and described later. Further, an inscribing cover 4b is provided on the inscribing surface 4a of the section 4 so that raised dots of braille can be formed on the labeling tape 1, using depressions formed in the reverse surface of the inscribing cover 4b and the heads of the push pins 2e.

The attachment position of each solenoid 2a and the position of a corresponding fulcrum 2c can be adjusted within a predetermined range in the longitudinal direction of a corresponding lever 2d. In this structure, the height of inscription can be adjusted by changing the stroke of each push pin 2e.

In FIG. 1A, a label transfer motor 3a is provided on the left side of the inscribing mechanism 2 for transferring the labeling tape 1 to the left in the figure. A rubber roller 3b disposed to rotate in a direction indicated by the arrow is provided on the axis of rotation of the motor 3a for transferring the labeling tape 1. The motor 3a and the rubber roller 3b constitute a transfer mechanism 3 which uses the friction of the rubber roller 3b that occurs when the motor 3a rotates, thereby continuously transferring the to-be-processed labeling tape 1 to the left by a necessary amount. The inscribing mechanism 2 and the transfer mechanism 3 constitute a braille inscribing mechanism.

Figure 3:
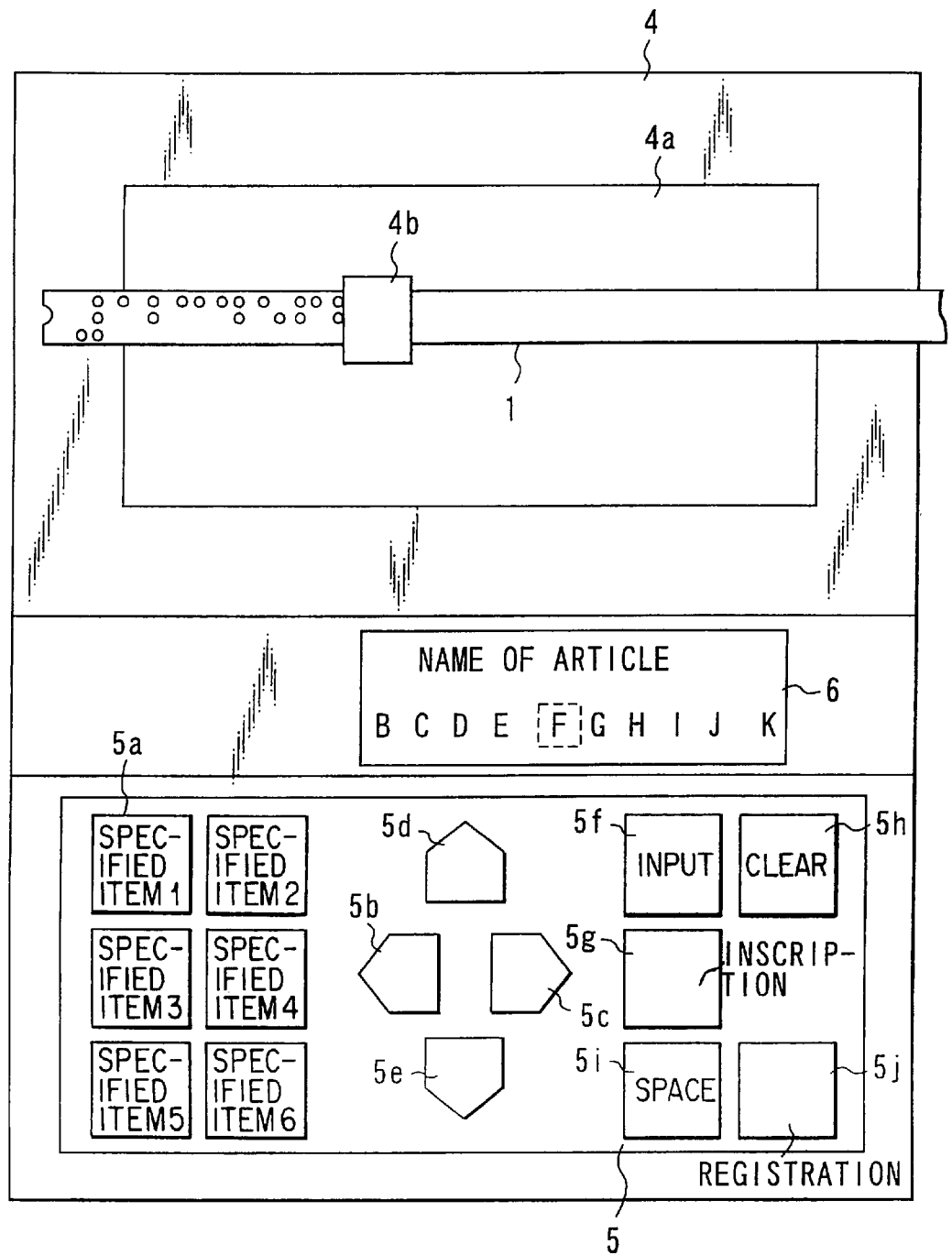
FIG. 3 is a plan view illustrating a braille label writer according to an embodiment of the invention.

FIG. 3 shows a braille label writer according to an embodiment of the invention, which uses the above-described braille inscribing mechanism and is aimed at being used in general stores, supermarkets, etc. for displaying information on articles or vending machines using braille. In FIG. 3, reference numeral 4 denotes a braille inscribing section 4 provided with the above-mentioned braille inscribing mechanism, and has an inscribing surface 4a covered with an inscribing cover 4b.

The labeling tape 1 is fed from right to left (in FIG. 3) through a space defined between the inscribing surface 4a and the inscribing cover 4b by the braille inscribing mechanism (not shown).

The braille label writer includes an operating section 5 and a display section 6 situated above the section 5, as well as the braille inscribing section 4. The operating section has a plurality of specified-article keys 5a for designating specified articles, four retrieval keys 5b, 5c, 5d and 5e for vertically and horizontally scanning a memory, an input key 5f for inputting and temporarily storing a retrieved letter in a register 5n, an inscribing key 5g for inscribing braille corresponding to the input letter, a clear key 5h for erasing input data, a space key 5i for inserting a space between inscribed braille characters, and a registration key 5j for registering the name of a retrieved article as a specified article.

The display section 6 is formed of, for example, liquid crystal, and disposed to display, on its upper portion, the name of an article input via the specified-article key 5a of the operating section 5 or letters retrieved using the retrieval keys 5b–5e of the section 5, and displays, on its lower portion, a series of letters that are now being retrieved or an instruction matter necessary for the operation.

The braille label writer can be connected to a printer device 7 as a separate device. Where they are connected, letters can be recorded simultaneously when braille is inscribed, as is shown in FIG. 2A.

To inscribe braille indicative of a registered, specified article using the braille label writer constructed as above, the specified-article key 5a corresponding to the specified article is pushed, whereby the name of the article is read from a memory 5k and displayed on the upper portion of the display section 6. When the inscribing key 5g has been pushed after confirming the contents of the display, inscription information is supplied to the braille inscribing section 4, thereby driving the label transfer motor 3a of the braille inscribing section 4, and applying a current pulse to a desired one of the solenoids 2a of the inscribing mechanism 2. As a result of the application of the current, the desired solenoid 2a and accordingly the lever 2d connected to the head of the movable core 2b of the solenoid are pulled down. Then, the lever 2d rotates about the fulcrum 2c, and the other end of the lever moves upward. Since the other end of the lever holds the push pin 2e, the push pin 2e projects from the inscribing surface 4a, thereby forming a raised dot on the labeling tape 1. The current to be applied to the solenoid 2a is supplied from a driving current control circuit (not shown) controlled by inscription information. The application of driving current pulses is synchronized with the feeding of the labeling tape 1. Current pulses are sequentially (but not simultaneously) applied to the solenoids 2a at appropriate time points as shown in the driving current waveforms of FIG. 2B. As a result, a braille character, which consists of a maximum of six raised dots (these dots are arranged in two columns each including a maximum of three raised dots), is inscribed in units of one column, and a series of braille characters are inscribed with a space inserted after every braille character, as is shown in FIG. 2A. After the inscription of braille characters corresponding to the stored series of letters, the labeling tape 1 is forwarded by a necessary length, thereby stopping the motor 3a. This is the termination of braille inscription indicative of the name of one article.

To inscribe braille corresponding to retrieved letters, the retrieval keys 5b, 5c, 5d and 5e are operated to display desired letters on the lower portion of the display section 6. After displaying the desired letters in predetermined positions, the input key 5f is pushed to temporarily store them in a register 5n and to display them on the upper portion of the display. After the letters of the name of an article to be inscribed in braille are stored and displayed one by one, and all the letters are retrieved, the inscribing key 5g is pushed, whereby letter codes corresponding to the article name temporarily stored in the register 5 n are converted into braille codes by code converting means 5m and supplied to the braille inscribing section 4, where braille corresponding to the article name is inscribed in the same manner as described above.

To temporarily store the name of an article selected by the retrieval operation 5l, as a specified article in the register, that one of the specified-article keys 5a, which corresponds to a to-be-registered article, and the registration key are simultaneously pushed when the name is displayed on the display section 6, whereby the name is stored in the predetermined area of the register 5n which corresponds to the specified-article key 5a.

Figure 4:
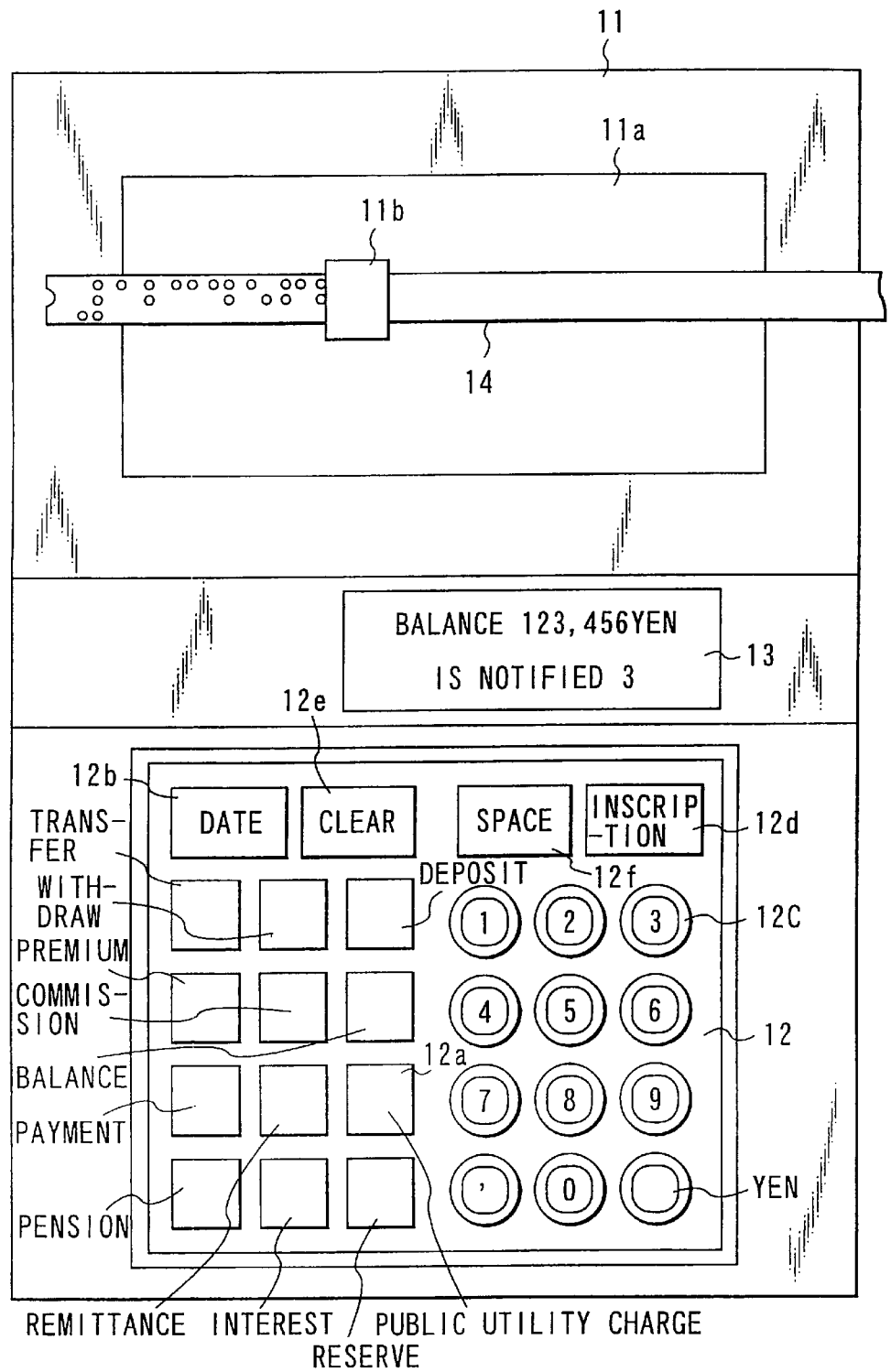
FIG. 4 is a plan view illustrating a braille label writer according to another embodiment of the invention.
Figure 5:
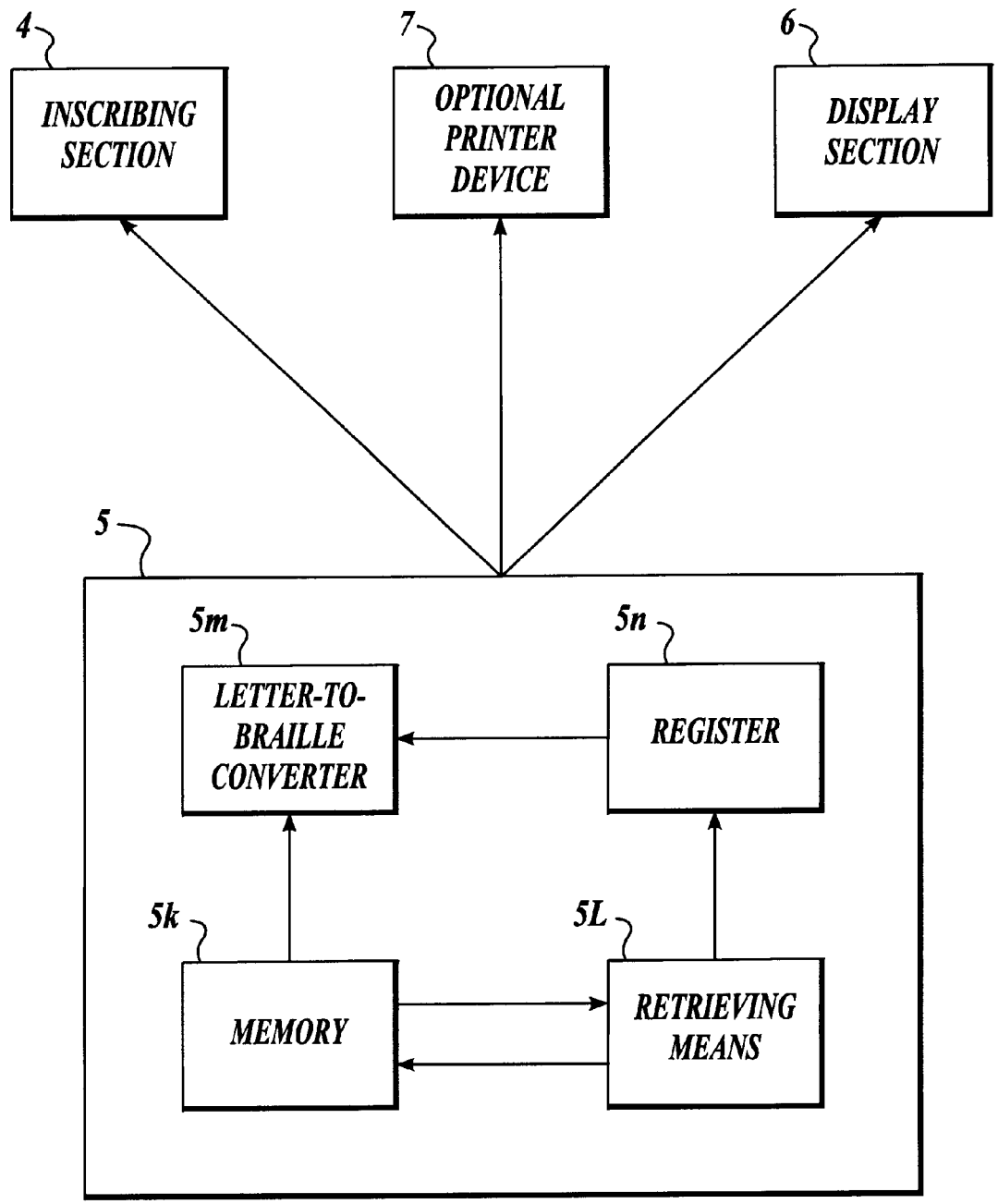
FIG. 5 is a schematic view of one embodiment of the braille label writer showing components and the optional printer.

Referring then to FIG. 4, a second embodiment will be described. This embodiment is directed to a braille label writer supposed to be used in a bank, a post office, etc. In FIG. 4, reference numeral 11 denotes a braille inscribing section including a braille inscribing mechanism, reference numeral 12 an operating section, and reference numeral 13 a display section.

The operating section 12 includes a plurality of business operation keys 12a for designating the contents of business operations, a date key 12b for inputting the date, a numeral key 12c for inputting the amount of money, an inscribing key 12d for inscribing braille corresponding to data such as the contents of business operations, the input amount of money, etc., a clear key 12e for erasing the input data, and a space key 12f for inserting a space after every braille character.

The display section 13 is formed of, for example, liquid crystal, and disposed to display, on its upper portion, the contents of a business operation input via the business operation key 12a of the operating section 12, or the amount of money input via the numeral key 12c in accordance with the business operation, and displays, on its lower portion, an instruction matter necessary for the operation.

The inscribing surface 11a of the braille inscribing section 11 is formed flat to facilitate the transfer of a labeling tape 14 for inscribing braille thereon, to the left in FIG. 4. Further, the upper surface of an inscribing head section provided at an upper portion of the above-described inscribing mechanism (not shown) is located slightly left of center of the inscribing surface 11a, and is in contact with that portion of the inscribing surface 11a which is covered with the inscribing cover 11b. The labeling tape 14 is fed from right to left in the figure through a space defined between the inscribing surface 11a and the inscribing cover 11b by the transfer section (not shown) of the braille inscribing mechanism. Desired data input via the operating section 12 is displayed on the display section 13. When the operator has pushed the inscribing key 12d of the operating section 12 after confirming the input data, necessary braille is inscribed on the labeling tape 14. FIG. 4 shows a state in which the labeling tape 14 with braille inscribed thereon is being output.

Also in this embodiment, functions to be imparted to means necessary for braille inscription, ranging from the operating section to the braille inscribing mechanism, are intensively provided. Since the display section, the braille inscribing mechanism, etc. other than the operating section are substantially the same as those employed in the first embodiment, no description will be given thereof.

The invention is not limited to the above-described embodiments, but may be modified in various manners without departing from its scope.

The invention can provide the following advantages:

a) Since the plunger and the push pin of each solenoid of the braille inscribing means are arranged parallel to each other, and are synchronized with each other by a lever having its intermediate portion supported rotatably about a fixed fulcrum, the solenoids of the inscribing means can be concentrically provided on the reverse side of a sheet on which braille is to be inscribed. This means that the braille label writer can be made compact.

b) Since the fulcrums of the solenoids and the levers can be adjusted in position, the height of the push pins can be changed, which means that the inscribing pressure can be controlled.

c) Since current pulses are applied to the solenoids of the braille inscribing means with appropriate time lags so that the current pulses will not simultaneously be applied, the required power capacitance can be reduced.

d) Since functions to be imparted to means for forming a braille label, ranging from the storage means to code converting means for directly reading a braille character, are intensively provided using letter codes, a braille label writer of a size and a price suitable for, for example, general stores can be provided.

e) Provision of a specified-item key facilitates input of a specified business or commodity.

f) A letter corresponding to a braille character can be displayed by simply operating a cursor key or a specified-item key. This facilitates the operation of the device by sighted people.

g) Provision of printing means enables display of usual letters indicative of the contents of created braille, which means that even sighted people with no knowledge of braille can confirm the contents of the created braille.

h) In the braille label writer of the invention, a labeling tape is used which has a separable protective paper sheet adhered to its reverse surface with an adhesive, and is made of a transparent material with a direction mark printed thereon. As a result, the label writer can create a label that can be easily handled, can be adhered even to an article or device on which the name of an article is written for sighted people, and can be adhered in a correct direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A braille label writer for inscribing braille on a labeling tape, comprising:

an operating section provided with operation keys including an input key;

a memory for storing information concerning letter codes and braille codes;

a display section for displaying information including letters, a letter-to-braille converter for converting a letter code into a braille code;

an inscribing mechanism having push pins for inscribing braille corresponding to the converted braille code on the labeling tape; and a transfer mechanism for transferring the labeling tape through the inscribing section to run over the push pins;

wherein the inscribing mechanism includes a plurality of solenoids having plungers, levers provided for the respective solenoids for transmitting driving forces of the plungers of the solenoids, the solenoids being stationary in the label writer, and the push pins forming raised braille characters on the labeling tape, the plungers being arranged parallel to the push pins, each of the levers having one end rotatably supported by an upper portion of a corresponding one of the plungers, also having an intermediate portion supported rotatably about a stationary fulcrum, and having another end holding, with a certain freedom, a lower end of a corresponding one of the push pins.

2. A braille label writer according to claim 1, wherein the fulcrum and the solenoids are adjustable in position.

3. A braille label writer according to claim 1, further comprising a controller having voltage pulses, for controlling the respective solenoids of the inscribing mechanism, the controller having time lags so that the voltage pulses will not be applied simultaneously.

4. A braille label writer according to claim 3, the push pins are arranged in line with a slight inclination from a vertical line to the moving direction of the labeling tape, to offset the time lag of each of the voltage pulses applied to the plungers, thereby rendering the braille characters of one line to be inscribed in line on the labeling tape vertically to the moving direction of the labeling tape.

5. A braille label writer according to claim 1, wherein the operating section includes retrieval keys for retrieving letter codes stored in the memory.

6. A braille label writer according to claim 1, wherein the input key is for inputting a specified item that consists of a plurality of letters.

7. A braille label writer according to claim 6, further comprising a register to temporarily store the plurality of letters for the specified item inputted by the input keys.

8. A braille label writer according to claim 1, further comprising a printer device for printing a letter corresponding to a braille character output from the inscribing mechanism.

* * * * *